J. S. GAUNT & H. DYSON.
BEARING FOR SUPPORTING THE FLIERS AND WHERVES ON THE BOLSTER TUBES OF SPINNING AND DOUBLING MACHINES.
APPLICATION FILED OCT. 23, 1909.
1,039,726.
Patented Oct. 1, 1912.
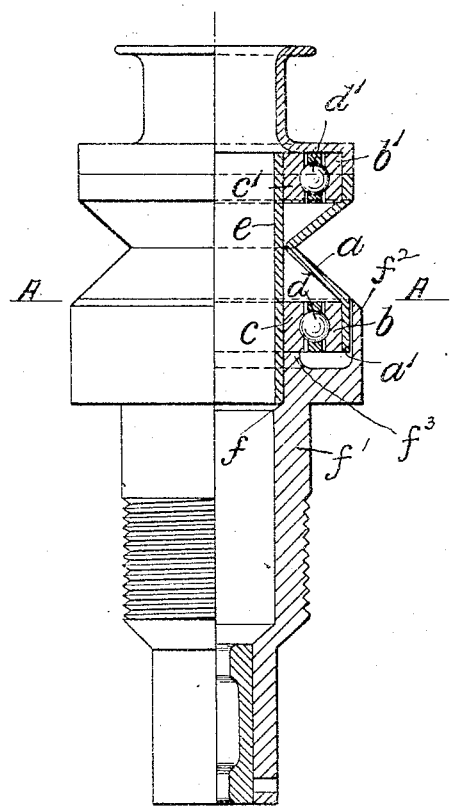
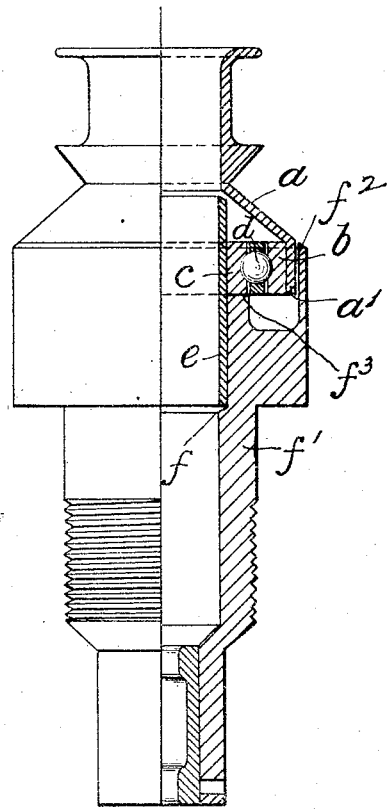
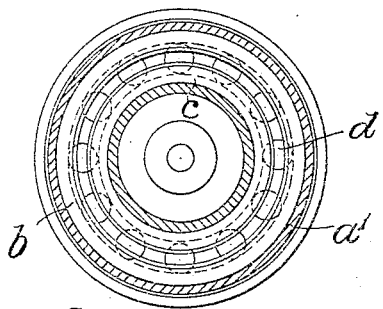
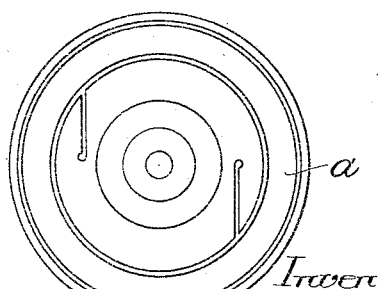
Witnesses.
Wills H. Burrowes
Walter Chism
Inventors.
Joseph Shaw Gaunt.
Harry Dyson.
by their Attorneys.
Howson & Howson

UNITED STATES PATENT OFFICE.

JOSEPH SHAW GAUNT, OF MANCHESTER, AND HARRY DYSON, OF HUDDERSFIELD, ENGLAND.

BEARING FOR SUPPORTING THE FLIERS AND WHERVES ON THE BOLSTER-TUBES OF SPINNING AND DOUBLING MACHINES.

1,039,726.

Specification of Letters Patent.

Patented Oct. 1, 1912.

Application filed October 23, 1909. Serial No. 524,517.

*To all whom it may concern:*

Be it known that we, JOSEPH SHAW GAUNT and HARRY DYSON, residing, respectively, at Cromford Court, Manchester, in the county of Lancaster, England, and 65 May street, Lockwood, Huddersfield, in the county of York, England, and both subjects of the King of Great Britain and Ireland, have invented Improvements in Bearings for Supporting the Fliers and Wherves on the Bolster-Tubes of Spinning and Doubling Machines, of which the following is a specification.

This invention relates to improved bearings for supporting the fliers and wherves on the bolster tubes in machines employed for spinning and doubling cotton and other fibrous substances.

The flier and the wherve which are ordinarily formed in one piece have hitherto been internally bored to fit accurately on the upper end of the bolster tube, which has been turned to fit therein, but by these means a close revolving fit causes friction, or if not fitted accurately the drag on the wherve causes oscillation and uneven winding. We remedy this defect by employing ball bearings in such a manner that the flier and the wherve can be fitted accurately on the bolster tube and rotate with a minimum of friction.

In the accompanying drawings:—Figure 1 is a side view partly in section, showing our improvement applied to a flier and wherve; Fig. 2, is a sectional plan on the line A—A Fig. 1; Fig. 3, is a side view, partly in section, showing the application of our improvement to the bottom portion of the wherve; and Fig. 4, is a plan view of Fig. 3.

According to this our said invention, we bore the bottom flange $a'$ of the wherve $a$ and fit securely therein a steel ring $b$, whose interior surface is grooved to form a ball race; we place within this ring another ring $c$ of smaller diameter, whose outer surface is grooved to form a similar ball race; this smaller ring is retained within the larger ring by placing balls $d$ in the space between the two rings; we place rings $b'$ and $c'$ with balls $d'$ constructed and arranged as herein previously described within the upper portion of the wherve $a$; both of the aforesaid inner rings $c$ and $c'$ are bored for the bolster tube $e$ to fit accurately therein, and may be keyed on to the bolster tube or secured by any well known method. If preferred the larger ring may be dispensed with and the inner surface of the upper and lower portions of the wherves may be formed to receive the balls and the lesser rings; the balls may be prevented being in contact by spacing pins or by forming separation on the interior of he rings, or any well known form of separator may be inserted in the ball race. The bolster tube $e$ rests upon an internal annular shoulder $f$ formed in the bolster $f'$, said bolster being provided with a flange $f^2$ inclosing flange $a'$.

In the modification shown in Fig. 3, the wherve $a$ is formed to be fitted with one ball race only.

As is clearly shown in Figs. 1 and 2 of the drawings, the rings $b$ and $c$ are the same height so that they lie in the same plane. The bolster $f'$ is provided with an inner annular slot or ledge $f^3$ that forms a base bearing for the ring $c$, the seat $f^3$ being obviously in a lower plane than the upper end of flanges $a'$ and $f^2$, said flange $f^2$ and seat $f^3$ being in spaced relation and having a lubricant groove therebetween.

We claim:—

1. In a spinning or doubling machine, the combination of a wherve having a depending annular flange, a bearing ring securely fitted in said flange and having its inner surface provided with an annular groove, a bolster having an upper external flange that surrounds the wherve flange and provided with an internal annular seat that is spaced from and in a lower plane than the upper portion of the external flange, a bolster tube, a bearing ring carried by the tube and having a base bearing on the seat, the tube ring being provided with an outer groove complemental to the inner groove of the wherve ring to provide a bearing race, and anti-friction bearings in said race.

2. In a spinning or doubling machine, the combination with a wherve having upper and lower bearing rings therein, a bolster having a flange for inclosing the base of the wherve, said bolster being provided with an inner shoulder, a bolster tube seated on the